US008499010B2

(12) United States Patent
Gracie et al.

(10) Patent No.: US 8,499,010 B2
(45) Date of Patent: Jul. 30, 2013

(54) GARBAGE COLLECTION IN A MULTIPLE VIRTUAL MACHINE ENVIRONMENT

(75) Inventors: Charles R. Gracie, Kanata (CA); Andrew R. Low, Stittsville (CA); Ashutosh Mehra, Bangalore (IN); Prashanth K. Nageshappa, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 12/975,559

(22) Filed: Dec. 22, 2010

(65) Prior Publication Data

US 2012/0166498 A1 Jun. 28, 2012

(51) Int. Cl.
*G06F 17/30* (2006.01)
(52) U.S. Cl.
USPC .......... 707/813; 707/E17.005; 711/171; 711/172
(58) Field of Classification Search
None
See application file for complete search history.

(56) References Cited

U.S. PATENT DOCUMENTS

| | | | |
|---|---|---|---|
| 5,819,304 A * | 10/1998 | Nilsen et al. ................. 711/5 |
| 7,216,136 B2 | 5/2007 | Bacon et al. |
| 7,376,684 B2 | 5/2008 | Blandy |
| 2005/0198088 A1 | 9/2005 | Subramoney et al. |
| 2006/0248042 A1 | 11/2006 | Anna Janssens |
| 2007/0016633 A1 | 1/2007 | Lindholm et al. |
| 2008/0250089 A1 | 10/2008 | Siegwart et al. |
| 2009/0055615 A1* | 2/2009 | Creamer et al. ............. 711/170 |
| 2010/0107168 A1 | 4/2010 | Auerbach et al. |

OTHER PUBLICATIONS

R. M. Muthu Kumar and D. Janakiram; "YAMA: A Scalable Generational Garbage Collector for Java in Multiprocessor Systems", Distributed and Object Systems Lab, Dept. of Computer Science & Engg., Indian Institute of Technology, Madras, India.
"Memory Management in the Java HotSpot Virtual Machine", Sun Microsystems, Inc., Apr. 2006.
"Deterministic Garbage Collection: Unleash the Power of Java with Oracle JRockit Real Time", An Oracle White Paper, Aug. 2008.
Perry Cheng and Guy E. Blelloch, "A Parallel, Real-Time Garbage Collector", Computer Science Department, Carnegie Mellon University, Pittsburgh, PA.
Katherine Barabash, Ori Ben-Yitzhak, Irit Goft, Elliot K. Kolodner, Victor Leikehman, Yoav Ossia, and Avi Owshanko of IBM Haifa Research Lab and Erez Petrank, Technion, Israel; "A Parallel, Incremental, Mostly Concurrent Garbage Collector for Servers", ACM Transactions on Programming Languages and Systems, vol. 27, No. 6, Nov. 2005, pp. 1097-1146. Tony Printezis, "Number of Parallel GC Threads", Jan. 23, 2009.
Tony Printezis, Charlie Hunt and Ludovic Poitou, Presentation for "Garbage Collection Tuning in the Java HotSpot Virtual Machine", (Slide #20), Sun Microsystems, Inc.

* cited by examiner

*Primary Examiner* — Anteneh Girma
(74) *Attorney, Agent, or Firm* — Thomas E. Lees, LLC (57) ABSTRACT

Garbage collection processes are automatically tuned on a system comprising a plurality of virtual machines running on a physical processing device with multiple physical processors. Tuning is implemented for each garbage collection process, by updating a load variable to reflect that a new garbage collection process has started, the load variable having a value that is based at least in part on a number of garbage collection processes that are currently running on the system. Tuning further comprises creating a number of garbage collection threads based at least in part on the current value of the load variable and/or number of processors, where the garbage collection threads are used to perform at least a portion of at least one phase of the new garbage collection process. Tuning further comprises re-updating the load variable to reflect completion of the new garbage collection process.

16 Claims, 5 Drawing Sheets

GARBAGE COLLECTION IN A MULTIPLE VIRTUAL MACHINE ENVIRONMENT

BACKGROUND

Various aspects of the present invention relate generally to garbage collection in virtual machines, and more specifically to the automated tuning of garbage collection processes in an environment supporting multiple virtual machines.

A virtual machine is a software representation of a physical machine that provides resources and abstractions to an application running within the virtual machine. To provide necessary resources, the virtual machine may reserve a single contiguous slot of memory, often referred to as a heap, from a host physical computer. The heap is used to temporarily store objects created by the application running on the virtual machine.

At certain times, such as when the heap is close to full, the associated virtual machine invokes a garbage collection (GC) process. The garbage collection process is typically broken down into multiple phases or operations. For instance, a basic garbage collection process initially identifies objects in an associated heap that are no longer being used. The garbage collection process then reclaims the memory within the heap that is occupied by the unused objects that were previously identified. For instance, the garbage collection process may de-allocate objects identified as being unused so that memory within the heap is freed up for future allocations.

However, in certain situations, a basic garbage collection process will not suffice. As such, the garbage collection process may also include an additional compaction phase. The compaction phase is utilized to defragment the allocated objects that were not previously reclaimed, so as to move allocated objects that are still being used into contiguous memory chunks within the heap.

BRIEF SUMMARY

Methods, systems, and computer program products are described herein, to tune garbage collection in a multiple virtual machine environment. Tuning is implemented for each garbage collection process, by updating a load variable to reflect that a new garbage collection process has started. The load variable has a value that is based at least in part on a number of garbage collection processes that are currently running on an associated system. Tuning further comprises determining a number of garbage collection threads to participate in garbage collection based at least in part on the current value of the load variable, where the garbage collection threads are used to perform at least a portion of at least one phase of the new garbage collection process. Tuning further comprises re-updating the load variable to reflect completion of the new garbage collection process. The number of threads may be determined, for example, by obtaining the load variable, deriving a thread variable based at least in part on the load variable, and using a number of garbage collection threads that is based at least in part, upon the thread variable and/or number of physical processors within the associated physical system.

DETAILED DESCRIPTION

The present invention provides methods, systems, and computer program products for optimizing garbage collection in a multiple virtual machine system. As will be described in greater detail herein, various aspects of the present invention optimize garbage collection by automatically tuning a number of garbage collection threads that are simultaneously used by a computing device on behalf of a corresponding virtual machine so as to manage the utilization of central processing unit (CPU) resources available on the computing device for garbage collection.

Figure 1:
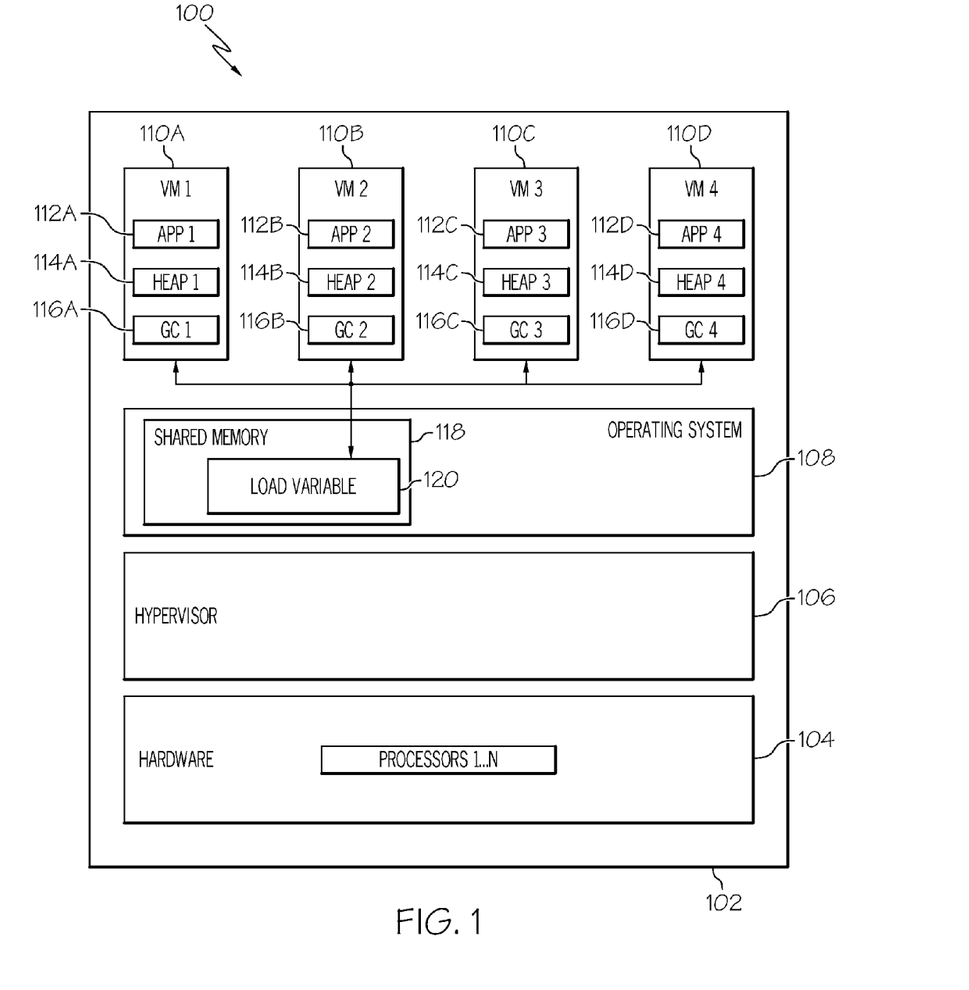
FIG. 1 is a block diagram illustrating aspects of the present invention, having multiple virtual machines in a single physical computing environment that includes a plurality of physical processors.

Referring now to the drawings, and in particular, to FIG. 1, a block diagram 100 illustrates select components of an exemplary system 102 that can be utilized to tune garbage collection processes of multiple virtual machines, according to aspects of the present invention. The exemplary system 102 includes hardware 104, a hypervisor 106, and at least one operating system 108. The hardware 104 includes physical components, such as a plurality of physical processors, memory and related technologies that are associated with a physical computer processing device. The hypervisor 106 is a virtualization technology that allows multiple operating systems 108 to run concurrently on the hardware 104. Each operating system 108 typically comprises software that serves as a platform to manage associated application programs that run within the corresponding operating system 108. Each operating system 108 further interfaces between the hardware 104, via the hypervisor 106, and a user of the corresponding physical processing device.

The exemplary system 102 further includes several virtual machines. For purposes of discussion herein, four virtual machines 110A, 110B, 110C, 110D are illustrated (collectively referred to as virtual machines 110). However, in practice, any number of virtual machines may be implemented. Each virtual machine 110 may correspond to any type of virtual machine technology that utilizes a garbage collection process to clean up an associated memory heap or similar memory structure. Exemplary virtual machines include, but are not limited to Java, Dis, Smalltalk, etc.

By way of illustration, and not by way of limitation, each virtual machine 110A, 110B, 110C and 110D is implemented as a process virtual machine that supports a single process. For instance, the first virtual machine 110A may comprise a Java Virtual Machine (JVM). As illustrated, a single application 112A operates within the first virtual machine 110A. During execution, the application 112A allocates objects into an associated memory heap 114A. From time to time, the virtual machine 110A can invoke a garbage collection process 116A to clean up the associated memory heap 114A. Garbage collection will be described in greater detail herein. In this regard, the application 112A, the heap 114A and any corresponding maintenance of the heap 114A uniquely associated with the application 112A garbage collection process 116A, are isolated from other aspects within the system 102 by virtue of their execution within the first virtual machine 110A.

In a manner analogous to that described with reference to the first virtual machine 110A, the second virtual machine 110B is illustrated as executing a single application 112B, which allocates objects into an associated memory heap 114B. From time to time, the second virtual machine 110B can invoke a garbage collection process 116B to clean up the associated memory heap 114B. The application 112B, heap 114B, and any corresponding maintenance of the heap 114B by the garbage collection process 116B, are isolated from other aspects within the system 102 by virtue of their execution within the second virtual machine 110B.

Likewise in an analogous manner, the third virtual machine 110C is illustrated as executing a single application 112C, which allocates objects into an associated memory heap 114C. From time to time, the third virtual machine 110C can invoke a garbage collection process 116C to clean up the associated memory heap 114C. The application 112C, heap 114C, and any corresponding maintenance of the heap 114C by the garbage collection process 116C, are isolated from other aspects within the system 102 by virtue of their execution within the third virtual machine 110C.

Still further, in an analogous manner, the fourth virtual machine 110D is illustrated as executing a single application 112D, which allocates objects into an associated memory heap 114D. From time to time, the fourth virtual machine 110D can invoke a garbage collection process 116D to clean up the associated memory heap 114D. The application 112D, heap 114D, and any corresponding maintenance of the heap 114D by the garbage collection process 116D, are isolated from other aspects within the system 102 by virtue of their execution within the fourth virtual machine 110D.

The system 102 further includes a shared memory space 118 that includes memory that stores a "load variable" 120. As will be described in greater detail herein with reference to FIG. 2, the virtual machines 110A, 110B, 110C, 110D are able to obtain the value of the load variable 120 within the shared memory 118 for purposes of performing garbage collection. In this regard, the load variable 120 is common to each of the virtual machines 110A, 110B, 110C, 110D.

As noted above, an application running on a virtual machine allocates objects into an associated heap. For instance, the first application 112A, also designated APP 1, executing on the first virtual machine 110A, allocates objects into its uniquely associated heap 114A. Upon certain predetermined conditions, such as when the heap 114A is close to full, the first virtual machine 110A invokes the garbage collection process 116A, also designated CG 1. The garbage collection process 116A identifies objects within the heap 114A that are no longer being used. The garbage collection process 116A further frees up the memory associated with identified objects for future allocations.

By way of illustration, a typical garbage collection process generally includes two phases, including a mark phase and a sweep phase. The mark phase identifies which objects in the associated heap are not being used. Correspondingly, the sweep phase reclaims memory within the heap that is occupied by the objects identified during the mark phase as being unused. Many garbage collection processes also optionally implement a compact phase that brings disjoined memory chunks storing objects that are still being used, into a contiguous portion of memory.

As illustrated, multiple virtual machines 110 are utilized to run applications and/or application instances concurrently on a single physical computing device. The virtual machines 110 facilitate the ability to exploit machine capability, improve scalability and provide application isolation. Moreover, multiple virtual machines 110 can exploit machine capabilities of computing devices that comprise multiple physical processors that operate in parallel. In systems that include multiple physical processors (multiple cores), e.g., processors 1-N as schematically illustrated in the hardware layer 104 of the system 102, a garbage collection process 116 can use parallel threads to optimize performance. Various aspects of the present invention automatically tune each phase of garbage collection to use an appropriate number of threads to perform parallel garbage collection.

For instance, as will be described in greater detail herein, garbage collection of virtual machine may be automatically tuned by updating the load variable 120 to reflect that a new garbage collection process has started. The load variable 120 has a value that is based at least in part on a number of garbage collection processes, e.g., 116A, 116B, 116C, 116D, etc., that are currently running on the system 100. Note that any given time, none or any number of garbage collection processes 116A, 116B, 116C, 116D, could be actively running. Tuning of garbage collection processes is further carried out by determining a number of garbage collection threads to participate in garbage collection based at least in part on the current value of the load variable, where the garbage collection threads are used to perform at least a portion of at least one phase of the new garbage collection process.

For instance, as illustrated, there are N physical processors provided by the hardware 104 of the system 102. A plurality of threads may thus be allocated across the various processors (1-N) to tune garbage collection performance for each garbage collection process that is actively running, as will be described in greater detail herein. Upon completion of a corresponding garbage collection process, the load variable 120 is re-updated to reflect completion of the garbage collection process.

According to further aspects of the present invention, garbage collection is performed in a physical environment having multiple physical processors, e.g., N physical processors provided by the hardware 104 of the system 102, where the physical environment hosts multiple virtual machines, such as the virtual machines 110A, 110B, 110C, 110D, etc., by invoking a garbage collection process that cleans a heap of an associated virtual machine executing in the physical environment and by identifying the number of other virtual machines currently in garbage collection. By knowing the number of virtual machines actively performing garbage collection, a number of parallel garbage collection threads to be used for the invoked garbage collection process is determined. In this regard, garbage collection is performed using the determined number of garbage collection threads.

Figure 2:
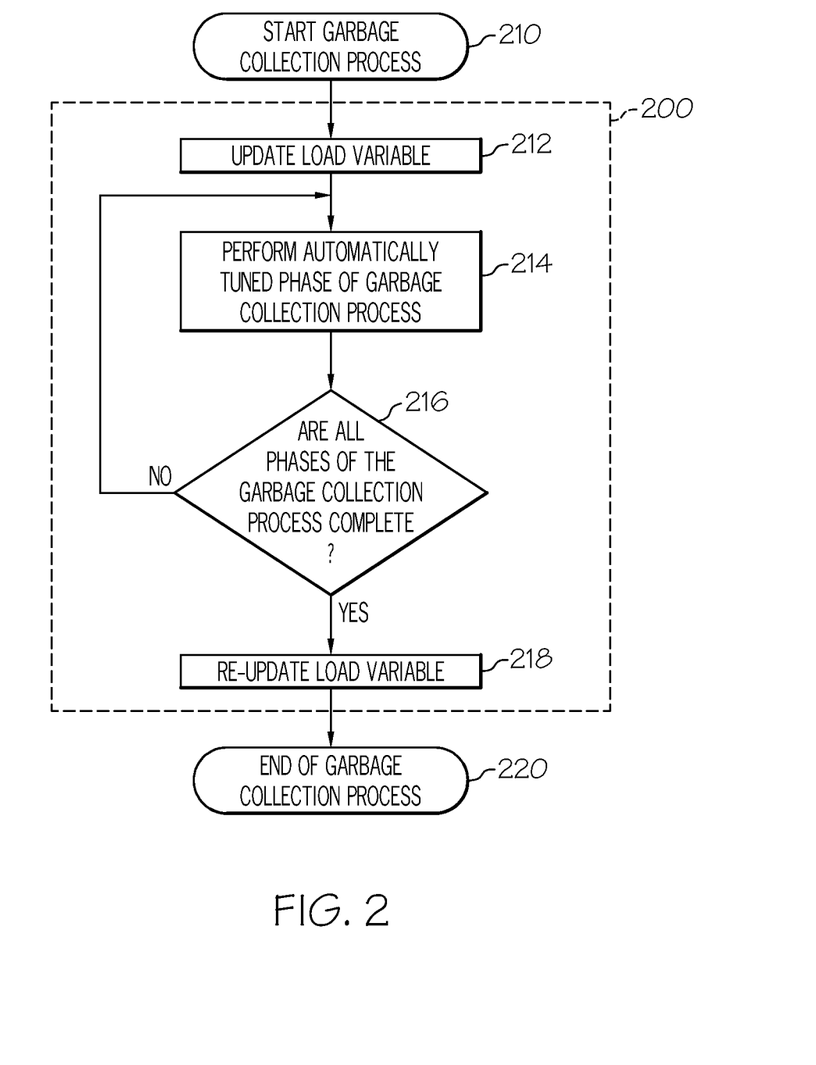
FIG. 2 is a flow chart illustrating an overall flow for tuning a garbage collection process of a corresponding virtual machine, according to aspects of the present invention.

Referring to FIG. 2, a flow chart illustrates the overall flow of a process 200 to tune garbage collection according to various aspects of the invention. The process 200 is suited for applications where multiple virtual machines/virtual machine instances, are operating on a common physical processing device that may utilize multiple physical processing cores. The process 200 may be implemented as a method or as part of a system that includes a combination of hardware and software. For instance, software may be stored in a physical memory device such that when the software is processed by at least one core processor, the software causes the corresponding physical machine to implement the actions specified by the process illustrated in FIG. 2. Thus, for example, the process 200 may be implemented on the system 102 illustrated and described with reference to FIG. 1. Still further, the process 200 may be implemented as a computer program product comprising a tangible computer readable storage medium having computer readable program code embodied therewith.

From time to time, a virtual machine initiates the start of the garbage collection process 200. By way of illustration, the virtual machine may invoke a garbage collection process based upon a number of different/alternative conditions and/or rules at 210, such as when the heap is close to full. The process 200 updates a load variable to indicate that the virtual machine has started a garbage collection process at 212. For example, the load variable may be stored in a memory location that is shared so that a plurality of virtual machines in the same physical processing device can read and write to the load variable, or otherwise cause the load variable to be updated. In this illustrative example, the load variable is used as a counter to indicate the number of virtual machines that are actively performing garbage collection.

In an exemplary implementation, updating the load variable at 212 increments the load variable by one. Thus, the load variable directly reflects the number of virtual machines (with access to the load variable) that are currently/actively performing the garbage collection process. For example, if two virtual machines are in the garbage collection process, then the load variable is equal to two. In other embodiments, other techniques for updating the load variable are possible including, but not limited to, adding a weighted number to the load variable or opting not to adjust the load variable despite launching a garbage collection process. The timing of the update to the load variable may occur before any other operations of the garbage collection process have started, after the garbage collection process has started, or concurrent with the start of another operation of the garbage collection process.

After updating the load variable at 212, the process 200 performs a phase of the garbage collection process at 214. The garbage collection process is automatically tuned based at least upon the current value of the load variable. The garbage collection phase may include, but is not limited to, a mark phase, a sweep phase, a compact phase, or a combination thereof. Performing a phase of the garbage collection process is described in greater detail in reference to FIG. 3. After the phase of the garbage collection process completes, the process 200 determines if all phases of the garbage collection process are complete at 216. If all phases of the garbage collection process are not complete, then the method 200 performs another phase of the garbage collection process 214.

If all phases of the garbage collection process are complete, then the process 200 re-updates the load variable 218 to reflect that the virtual machine will end or has ended the garbage collection process. The timing of the re-update may occur before all operations of the garbage collection process have ended, after the garbage collection process has ended, or concurrent with the end of the garbage collection process. In an exemplary implementation, re-updating the load variable at 218 may decrement the load variable by one or some other factor. Moreover, other techniques for re-updating the load variable at 218 are possible including, but not limited to, subtracting a weighted number to the load variable, taking no action, or implementing another function.

In an exemplary implementation, re-updating the load variable at 218 functions to undo or otherwise perform a complimentary function to the update performed at 212. Thus, whatever technique was used to update the load variable at 212, an inverse of the technique is used to re-update the load variable at 218. For example, if the technique for updating the load variable at 212 is to increment the load variable by one, then the technique for re-updating the load variable at 218 should be to decrement the load variable by one.

The garbage collection process ends at 220, typically when the associated heap has been cleaned. Referring to FIGS. 1 and 2 generally, the process 200 may be implemented, for example, on the system 102 of FIG. 1. Each time a garbage collection process 116A, 116B, 116C, 116D is called upon to clean the associated heap 114A, 114B, 114C, 114D respectively, the load variable 120 is updated, e.g., by atomically incrementing the value of the load variable 120. When a garbage collection phase is started, the load variable 120 may be atomically read, and based upon the value of the load variable, the number of garbage collection threads to be used is calculated. The system then creates and uses the computed number of garbage collection threads to perform the associated garbage collection phase. When a called upon garbage collection process 116A, 116B, 116C, 116D ends, the load variable 120 is re-updated, e.g., by atomically decrementing the value of the load variable 120.

Figure 3:
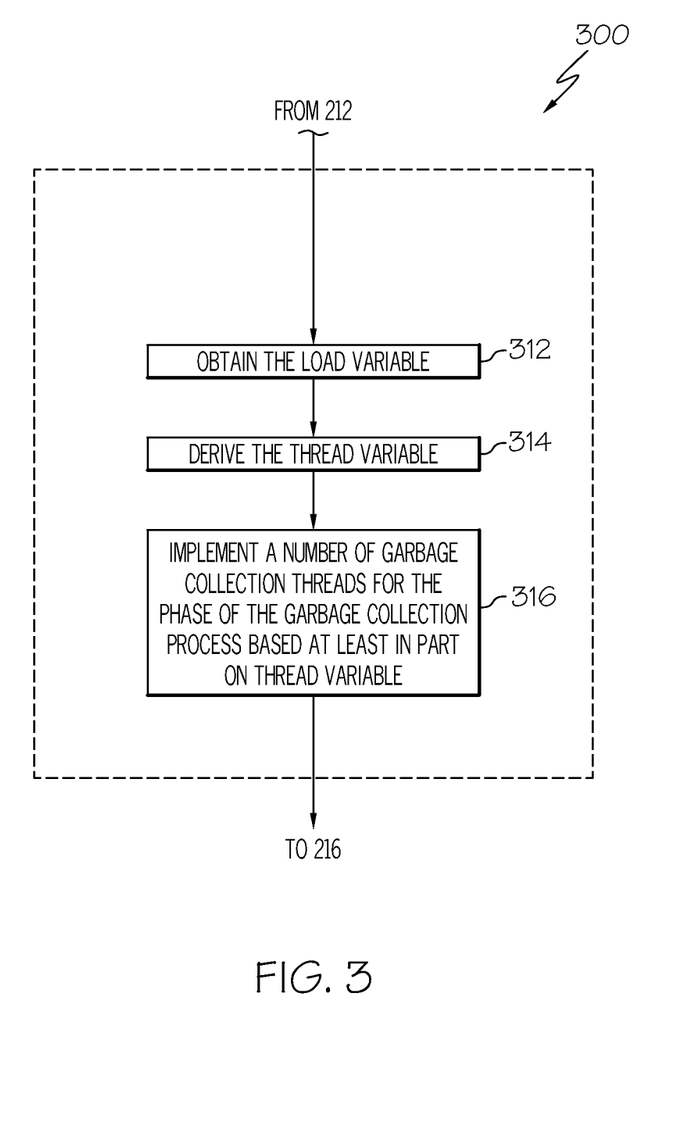
FIG. 3 is a flow chart illustrating an exemplary approach for determining a number of parallel threads for performing at least a portion of a garbage collection process of FIG. 2.

Referring to FIG. 3, a flow chart illustrates a process 300 for performing a phase of the garbage collection process, e.g., as illustrated at 214 of FIG. 2. In general, the process 300 determines a number of garbage collection threads to participate in garbage collection based at least in part on the current value of the load variable, where the garbage collection threads are used to perform at least a portion of at least one phase of the garbage collection process.

The process 300 obtains the current value of a load variable at 312. As an illustrative example, the process 300 can read the value of the load variable from a shared memory space. For instance, as noted in greater detail herein, the load variable may be shared by a plurality of virtual machines executing in a physical processing device, such as the load variable 120 described with reference to FIG. 1. As yet another illustrative example, the process 300 can request the value of the load variable from another source that is capable of obtaining the value of the load variable.

After obtaining the value of the load variable at 312, the process 300 derives a thread variable at 314, where the thread variable is based at least in part on the current value of the load variable. The thread variable indicates, for example, how many threads the phase of the garbage collection process should use. The process 300 may derive the thread variable at 314 in several ways including but not limited to the use of an equation, a look-up-table, a rule-based structure, or a combination thereof.

Deriving the thread variable at 314 may comprise deriving a thread variable based at least in part on a number of physical processors in the physical computing device that are accessible to a virtual machine implementing the new garbage collection process. For instance, an example of an equation for deriving the thread variable 314 is the number of physical processors that are capable of being allocated to garbage collection on behalf of the associated virtual machine, divided by the current value of the load variable.

The process 300, using the thread variable, implements a number of garbage collection threads for at least a portion of the garbage collection process at 316. In this manner, the number of garbage collection threads is based at least in part on the thread variable.

Figure 4:
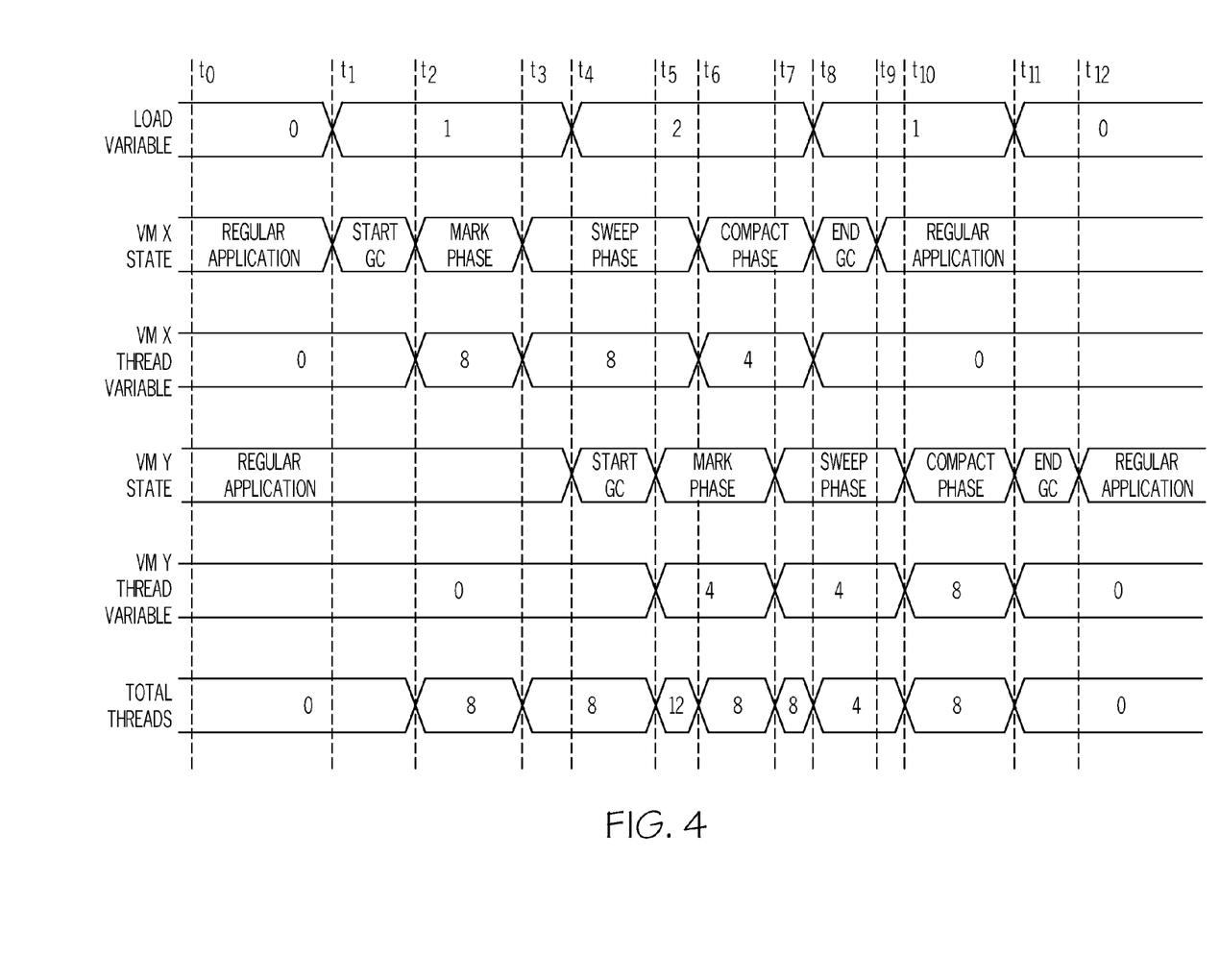
FIG. 4 is a timing diagram illustrating a simple exemplary environment in which multiple garbage collection processes are automatically tuned, according to aspects of the invention.

Referring to FIG. 4, a timing diagram is illustrated for a simplified example to demonstrate exemplary aspects of automated garbage collection tuning described more fully herein. For instance, the timing diagram of FIG. 4, could be associated with a system 102 as illustrated in FIG. 1, executing the processes described in FIGS. 2 and 3.

In FIG. 4, the designation "t" indicates time. The designation "LOAD VARIABLE" is the current value of the load variable, "VM X STATE" is the state of Application X, "VM X THREAD VARIABLE" is the thread variable for Application X, "VM Y STATE" is the state of Application Y, "VM Y THREAD VARIABLE" is the thread variable for Application Y and "TOTAL THREADS" indicates the total number of garbage collection threads running The states for the applications include "REGULAR APPLICATION," "START GC," "MARK PHASE," "SWEEP PHASE," "COMPACT PHASE," and "END GC." This example is merely illustrative and should not be considered limiting.

In the illustrative example, assume that there are two virtual machines, VM X and VM Y, each running one application, and that there are eight physical processors with access to the heap associated with each of the virtual machines VM X and VM Y. Also, assume that each virtual machine VM X and VM Y can use up to each of the eight physical processors. In this example, assume that the optimal number of garbage collection threads is eight. Further, assume that the technique for updating the load variable is to increment the load variable by one, and that the technique to derive the thread variable is the equation: the number of processors with access to the heap divided by the load variable. Still further, assume that the garbage collection process has three phases: mark, sweep, and compact.

At $t_0$ both virtual machines VM X and VM Y are in the "REGULAR APPLICATION" state. There, there are no garbage collection processes executing. As such, there are zero garbage collection threads. Further, the load variable is also zero.

At $t_1$ the virtual machine VM X operating Application X decides to start a garbage collection process to clean a memory heap uniquely associated with Application X. The Virtual Machine VM X enters the "START GC" state, and the load variable increments to 1.

At $t_2$ VM X enters the "MARK PHASE" state of the garbage collection process. VM X reads the load variable and determines the thread variable to be 8 (8 processors/load variable set to 1=8). Therefore, the mark phase of the garbage collection process associated with VM X uses eight threads. Moreover, the total thread count for the system is eight, which is the optimal number of threads for this illustrative example.

At $t_3$ VM X finishes the mark phase and enters the "SWEEP PHASE" state. VM X reads the load variable again and determines the thread variable to be 8 (8 processors/1=8). Therefore, the sweep phase uses eight threads, which is the optimal number of threads for this illustrative example.

At $t_4$ VM X is still in the sweep phase running on 8 threads. Further, VM Y decides to initiate a garbage collection process to clean a memory heap uniquely associated with Application Y. VM Y enters the "START GC" state, and the load variable increments to 2.

At $t_5$ VM X is still in the sweep phase running on 8 threads. Further, VM Y enters the "MARK PHASE" state. VM Y reads the load variable and determines the thread variable to be 4 (8 processors/load variable set to 2=4). Therefore, the mark phase of garbage collection associated with Virtual Machine VM Y uses four threads. The total thread count is 12, which is above the optimal number.

At $t_6$ VM X finishes the sweep phase and enters the "COMPACT PHASE" state. VM X reads the load variable a third time and determines the thread variable to be 4 (8 processors/2=4). Therefore, the compact phase uses four threads. VM Y is still using four threads to perform its mark phase. Thus, the total number of threads is 8, the optimal number threads for this illustrative example. Thus, the total thread count was above the optimal amount for a period of time that is less than a full phase of the garbage collection process.

At $t_7$ VM X is still in the compact phase running four threads. VM Y finishes the mark phase and enters the "SWEEP PHASE" state. VM Y reads the load variable again and determines the thread variable to be 4. Therefore, the sweep phase uses four threads, and the total number of threads running is eight, the optimal number of threads as noted above.

At $t_8$ VM X finishes the compact phase and enters the "END GC" state. The load variable re-updates by decrementing down to 1 to reflect that only one virtual machine remains in the garbage collection process. VM Y is still in the sweep phase running on four threads. Therefore, the total number of threads is four, which is below the optimal number of threads.

At $t_9$ VM X returns to the "REGULAR APPLICATION" state because garbage collection has ended.

At $t_{10}$ VM Y finishes the sweep phase and enters the "COMPACT PHASE" state. VM Y reads the load variable a third time, which is now reduced to a value of 1, and determines the thread variable to be 8. Therefore, the compact phase uses eight threads. Notably, in this illustrative example, the system utilizes less than the optimal thread count for less than a full phase of the garbage collection process.

At $t_{11}$ VM Y finishes the compact phase and enters the "END GC" state. The load variable re-updates by decrementing down to 0 to reflect that no applications are in the garbage collection process. There are zero threads running the garbage collection process.

At $t_{12}$ VM Y returns to its "REGULAR APPLICATION" state.

In this illustrative example, a number of garbage collection threads is updated at least once per phase of each garbage collection process. More particularly, each garbage collection process determines the number of threads to participate in the garbage collection activity at the start of each phase of the corresponding garbage collection process. For example, a number of threads can be determined such as by reading the current value of the load variable, deriving a thread variable based at least in part on the current value of the load variable and using a number of garbage collection threads for the current phase of the garbage collection process, where the number of garbage collection threads is based at least in part on the thread variable. As another illustrative example, a pool of worker threads can be maintained such that the system can dynamically determine how many threads will participate in the garbage collection activity based on the value of the load variable.

Alternative arrangements may also be implemented. For instance, the virtual machines can check the value of the load variable at alternative or different times during processing. The virtual machines can also/alternatively check the value of the load variable more than once during a given cycle. For instance, a check may also be performed in the middle of a garbage collection cycle, so that the thread count can be re-tuned. This would provide finer resolution of thread optimization, where such optimizations may be required. Still further, aspects of the present invention can accommodate situations where certain lesser important applications can tolerate longer wait times to achieve overall optimal throughput, e.g., by weighting the value that a virtual machine uses to update the load variable. As yet another alternative, one or more virtual machines can use a different algorithm to determine the number of threads used by that virtual machine for garbage collection. Still further, a virtual machine may select not to update the load variable. In this regard, an optional command line parameter may be utilized so that each virtual machine can select whether automatic optimized tuning of thread count is to be implemented for a particular garbage collection process.

According to further aspects of the present invention, the load variable can be implemented in other manners, e.g., depending upon the platform, operating system, thread scheduling policies and other suitable parameters.

While the garbage collection process is running, the application running in the virtual machine that invoked garbage collection process is paused, which increases the response time of the application. However, according to aspects of the present invention, garbage collection tuning is automatically performed, e.g., to optimize the number of threads allocated to each garbage collection process, based for example, upon the number of available processors and the number of virtual machines in the garbage collection process. This results in minimizing the pause in application response time while waiting for the garbage collection process to terminate. The processes described herein also avoid deficiencies with conventional approaches where each virtual machine assumes that it is the only virtual machine running garbage collection on the system. On a multiple processor system, a conventional garbage collection process thus uses a number of parallel threads equal to the number of processors in the system to help optimize performance. In a system running multiple virtual machines, more than one virtual machine may start a garbage collection process, which results in more parallel garbage collection threads than processors in the system. This scenario can result in contention between the threads for the processor, which may increase the time for which associated applications are paused.

Various aspects of the present invention automatically tune each phase of a garbage collection process to use an appropriate number of threads to perform parallel garbage collection. Moreover, the automatic tuning takes into account the number of virtual machines that are simultaneously in garbage collection where the virtual machines in garbage collection share physical CPU resources. As such, virtual machines can be more adaptive to varying loads on the physical hardware of the host processing device. Also, manual tuning of virtual machine garbage collection can be eliminated.

Figure 5:
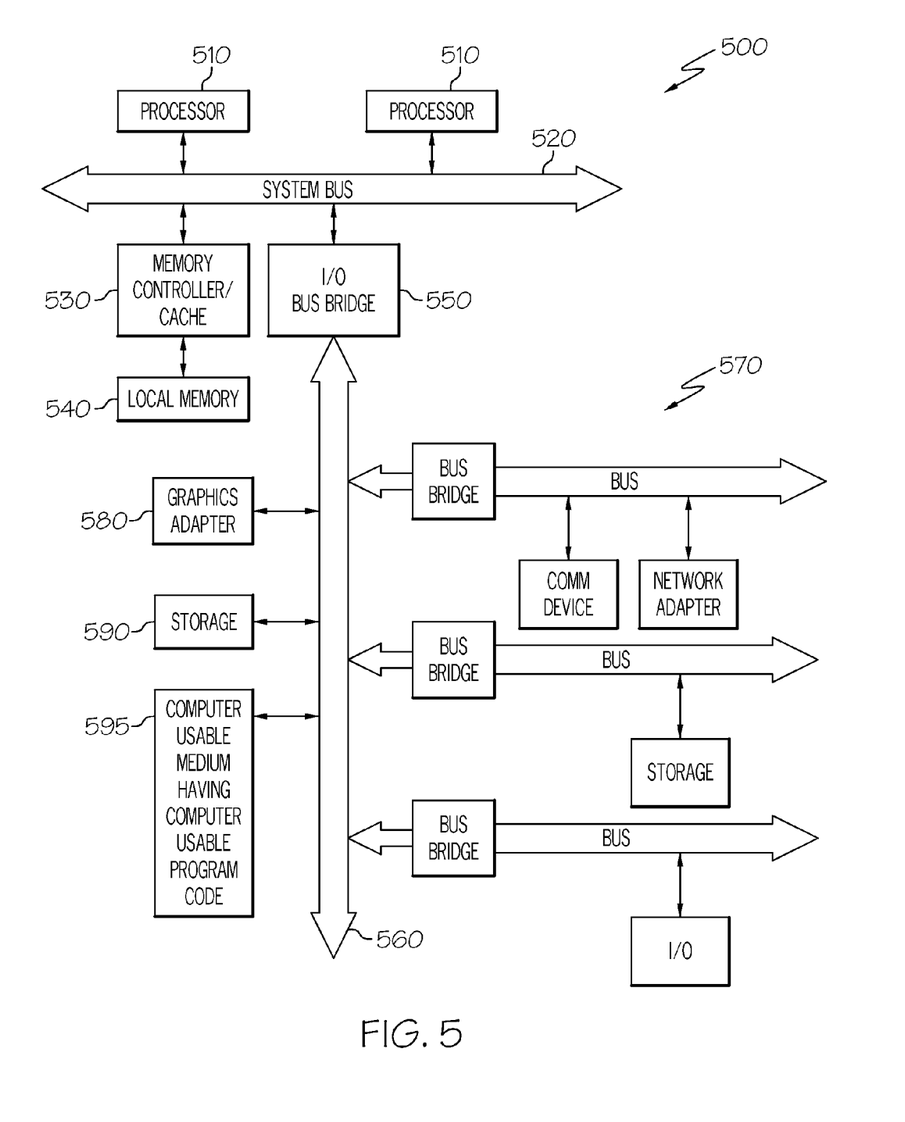
FIG. 5 is a block diagram of a computer system having a computer readable storage medium, the system suitable for implementing various aspects of the present invention, as described in greater detail herein.

Referring to FIG. 5, a block diagram of a data processing system is depicted in accordance with the present invention. Data processing system 500 may comprise a symmetric multiprocessor (SMP) system or other configuration including a plurality of processors 510 connected to system bus 520. Alternatively, a single processor 510 may be employed. Also connected to system bus 520 is memory controller/cache 530, which provides an interface to local memory 540. An I/O bus bridge 550 is connected to the system bus 520 and provides an interface to an I/O bus 560. The I/O bus may be utilized to support one or more buses and corresponding devices 570, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 580, storage 590 and a computer usable storage medium 595 having computer usable program code embodied thereon. The computer usable program code may be executed to implement any aspect of the present invention, for example, to implement any aspect of any of the methods and/or system components illustrated in FIGS. 1-4. Moreover, the computer usable program code may be utilized to implement any other processes that are associated with transferring objects, inter-heap communication, or other aspects as set out further herein.

The data processing system depicted in FIG. 5 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A computer readable storage medium with an executable program to tune garbage collection of virtual machines stored thereon, the wherein the program instructs a microprocessor to perform:
   update updating a load variable to reflect that a new garbage collection process has started, the load variable having a value that is based at least in part on a number of garbage collection processes that are currently running on a physical computing device;
   obtaining the current value of the load variable;
   deriving a thread variable based at least in part on the current value of the load variable;
   determining a number of garbage collection threads to participate in garbage collection based at least in part on the thread variable, where the garbage collection threads are used to perform at least a portion of at least one phase of the new garbage collection process;
   using a number of garbage collection threads for at least a portion of the garbage collection process; and
   re-updating the load variable to reflect completion of the new garbage collection process.

2. The computer readable storage medium of claim 1, wherein deriving a thread variable is further based at least in part on a number of physical processors in the physical computing device that are accessible to a virtual machine implementing the new garbage collection process.

3. The computer readable storage medium of claim 2, wherein deriving a thread variable derives the thread variable by dividing the number of processors by the load variable.

4. The computer readable storage medium of claim 1, wherein determining a number of garbage collection threads is performed at least once per cycle of the new garbage collection process.

5. The computer readable storage medium of claim 1, wherein determining a number of garbage collection threads comprises:
   performing a thread allocation process at the start of each cycle of the new garbage collection process, comprising:
      reading the current value of the load variable;
      deriving a thread variable based at least in part on the current value of the load variable; and
      computer readable program code configured to use a number of garbage collection threads for the current phase of the garbage collection process, the number of garbage collection threads based at least in part on the thread variable.

6. The computer readable storage medium of claim 1, wherein:
   updating a load variable further comprises incrementing the load variable by one; and
   re-updating the load variable further comprises decrementing the load variable by one.

7. A method to tune garbage collection of virtual machines, comprising:
   updating a load variable to reflect that a new garbage collection process has started, the load variable having a value that is based at least in part on a number of garbage collection processes that are currently running on a physical computing device;
   obtaining the current value of the load variable;
   deriving a thread variable based at least in part on the current value of the load variable;
   determining a number of garbage collection threads to participate in garbage collection based at least in part on the thread variable, where the garbage collection threads are used to perform at least a portion of at least one phase of the new garbage collection process;
   using a number of garbage collection threads for at least a portion of the garbage collection process; and
   re-updating the load variable to reflect completion of the new garbage collection process.

8. The method of claim 7, wherein deriving a thread variable comprising deriving a thread variable based at least in part on a number of physical processors in the physical computing device that are accessible to a virtual machine implementing the new garbage collection process.

9. The method of claim 8, wherein deriving a thread variable comprises dividing the number of processors by the load variable.

10. The method of claim 7, wherein creating a number of garbage collection threads comprises creating a number of garbage collection threads at least once per cycle of the new garbage collection process.

11. The method of claim 7, wherein determining a number of garbage collection threads comprises:
   performing a thread allocation process at the start of each cycle of the new garbage collection process, comprising:
      reading the current value of the load variable;
      deriving a thread variable based at least in part on the current value of the load variable; and
      using a number of garbage collection threads for the current phase of the garbage collection process, the number of garbage collection threads based at least in part on the thread variable.

12. The method of claim 7, wherein:
   updating a load variable further comprises incrementing the load variable by one; and
   re-updating the load variable further comprises decrementing the load variable by one.

13. A method of performing garbage collection implemented in a plurality of phases in a physical environment having multiple physical processors, where the physical environment hosts multiple virtual machines, comprising:
   invoking a garbage collection process that cleans a heap of an associated virtual machine executing in the physical environment;
   identifying the number of virtual machines currently in garbage collection;
   determining a number of parallel garbage collection threads to be used for the invoked garbage collection process based upon the number of virtual machines actively performing garbage collection by reading the value of a load variable at the start of each phase of the garbage collection process where the load variable indicates the number of virtual machines actively performing garbage collection and determining a number of parallel garbage collection threads for each phase of the garbage collection process based upon the value of the load variable; and
   performing the invoked garbage collection process using the determined number of garbage collection threads.

14. The method according to claim 13, wherein the garbage collection process is implemented in a plurality of phases, further comprising:
   identifying the number of virtual machines currently in garbage collection and determining a number of parallel garbage collection threads, for each phase of the garbage collection process.

15. The method according to claim 13, further comprising:
   updating the value of the load variable upon invoking the garbage collection process; and
   re-updating the value of the load variable at the end of the garbage collection process.

16. The method according to claim 15, where the load variable is stored in a shared memory feature that is common across a plurality of processes associated with the physical environment.

* * * * *